United States Patent [19]

Matsui

[11] Patent Number: 4,772,117
[45] Date of Patent: Sep. 20, 1988

[54] FOCUS DETECTING DEVICE HAVING BLUR DETECTING FUNCTION

[75] Inventor: Toru Matsui, Sakai, Japan

[73] Assignee: Minolta Camera Kabushiki Kaisha, Osaka, Japan

[21] Appl. No.: 53,695

[22] Filed: May 26, 1987

[30] Foreign Application Priority Data

May 27, 1986 [JP] Japan .................. 61-122000

[51] Int. Cl.⁴ .................................................. G03B 3/00
[52] U.S. Cl. ......................................... 354/402; 354/430
[58] Field of Search ............... 354/400, 402, 406, 407, 354/408, 403, 430

[56] References Cited

U.S. PATENT DOCUMENTS

| 4,218,119 | 8/1980 | Schickedanz . | |
|---|---|---|---|
| 4,264,161 | 4/1981 | Hosoe et al. . | |
| 4,474,447 | 10/1984 | Kawabata et al. | 354/406 |
| 4,527,053 | 7/1985 | Kinoshita et al. . | |
| 4,609,274 | 9/1986 | Iwashita et al. | 354/400 |
| 4,668,084 | 5/1987 | Suzuki et al. | 354/403 |
| 4,690,536 | 9/1987 | Nakai et al. | 354/402 |

FOREIGN PATENT DOCUMENTS

| 55430 | 4/1979 | Japan . |
| 55429 | 5/1979 | Japan . |
| 163032 | 12/1979 | Japan . |
| 129421 | 8/1982 | Japan . |
| 41331 | 9/1985 | Japan . |
| 233513 | 11/1985 | Japan . |
| 259907 | 12/1985 | Japan . |
| 259008 | 12/1985 | Japan . |

Primary Examiner—Russell E. Adams
Attorney, Agent, or Firm—Burns, Doane, Swecker & Mathis

[57] ABSTRACT

A focus detecting device having a function of detecting blur, including a focus detecting member, a detection member which receives two image signals of an identical object obtained in time series by an identical optical system so as to detect degree of coincidence between the two image signals, and a selector member for selecting whether operation of the focus detecting member and the selection member is performed continuously or operation of only the focus detecting member is performed.

5 Claims, 1 Drawing Sheet

FOCUS DETECTING DEVICE HAVING BLUR DETECTING FUNCTION

BACKGROUND OF THE INVENTION

The present invention generally relates to focus detecting devices for use in photographing apparatuses such as a camera, etc. and more particularly, to a focus detecting device having a function of detecting blur, which is provided with an operational system for detecting blur.

Conventionally, in photographing apparatuses such as a camera, etc., when blur is produced during taking of a photograph of an object to be photographed, such a phenomenon may take place that image quality of the photograph deteriorates and thus, it becomes impossible to obtain a satisfactory photograph. In order to prevent the undesirable phenomenon referred to above, cameras having a function of detecting blur have been proposed. Detection of blur is based on a principle that image signals of an identical object to be photographed are obtained twice at sequential points of time by an identical image forming system such that correlation between the two image signals is determined. If blur is not produced, the two image signals coincide with each other without displacing a spatial axis of one of the image signals. On the contrary, if blur is produced, a maximum correlation degree therebetween is obtained when a spatial axis of one of the image signals is displaced through a certain amount so as to coincide with that of the other one of the image signals. Since detection of blur is based on such principle, such a problem arises that in the case where the function of detecting blur is exercised, the object is required to be photographed twice in time series, thereby resulting in a time-consuming operation.

Meanwhile, in order to make cameras compact, several focus detecting devices combined with a function of detecting blur have been proposed. For example, U.S. Pat. No. 4,527,053 discloses a device for performing focus detection and detecting relative motion between an object to be photographed and a camera. A signal for detecting the relative motion is produced from a signal obtained from a focus detecting element such that the relative motion is detected upon completion of focus detection of the focus detecting element. Namely, in the device of this U.S. Patent, blur is detected by comparison of focus detecting signals generated at different points of time. Meanwhile, Japanese Patent Laid-Open Publication No. 259907/1985 discloses a blur detecting device in a distance detecting device of active (light emitting) type, in which distance detection is performed at least twice in time series such that amount of blur is determined. Furthermore, Japanese Patent Laid-Open Publication No. 259908/1985 discloses a device including a storage means for storing image signals obtained by a signal detecting element, in which the image signals stored at sequential points of time by the storage means are selected so as to be applied to a detection means for detecting amount of blur such that amount of blur is detected. However, all of these known devices are focus detecting devices combined with a function of detecting blur. Thus, the known devices conform to an object for taking a photograph of high image quality. However, in the known devices, focus adjustment is time-consuming due to a time period required for detecting blur and thus, it is impossible to repeat focus detection continuously and rapidly. Hence, in the known devices, in the case where focus adjustment is required to be performed continuously, for example, an photographer wishes to take a photograph rapidly at the time of a shutter chance and thus, such an inconvenience is incurred that the photographer may lose the shutter chance.

Photographic situations differ between a case where a photographer wishes to take a photograph of high image quality free from blur and a case where a photographer wishes to take a photograph on emergent occasions without losing a shutter chance. Therefore, it is generally desirable that focus detecting devices can be changed over to the different photographic situations. However, the above described known devices including a blur detecting mechanism have such a drawback that since the known devices are not provided with a changeover mechanism for changing over the known devices to the different photographic situations, it is impossible to take a photograph rapidly.

SUMMARY OF THE INVENTION

Accordingly, an essential object of the present invention is to provide a focus detecting device having a function of detecting blur, which eliminates the disadvantages inherent in the conventional focus detecting devices of this kind.

In order to accomplish this object of the present invention, a focus detecting device having a function of detecting blur comprises: a focus detecting means; a detection means which receives two image signals of an identical object obtained in time series by an identical optical system so as to detect degree of coincidence between the two image signals; and a selector means for selecting whether operation of said focus detecting means and said detection means is performed continuously or operation of only said focus detecting means is performed.

BRIEF DESCRIPTION OF THE DRAWING

This object and features of the present invention will become apparent from the following description taken in conjunction with the preferred embodiment thereof with reference to the accompanying drawing, in which.

DETAILED DESCRIPTION OF THE INVENTION

Figure 1:
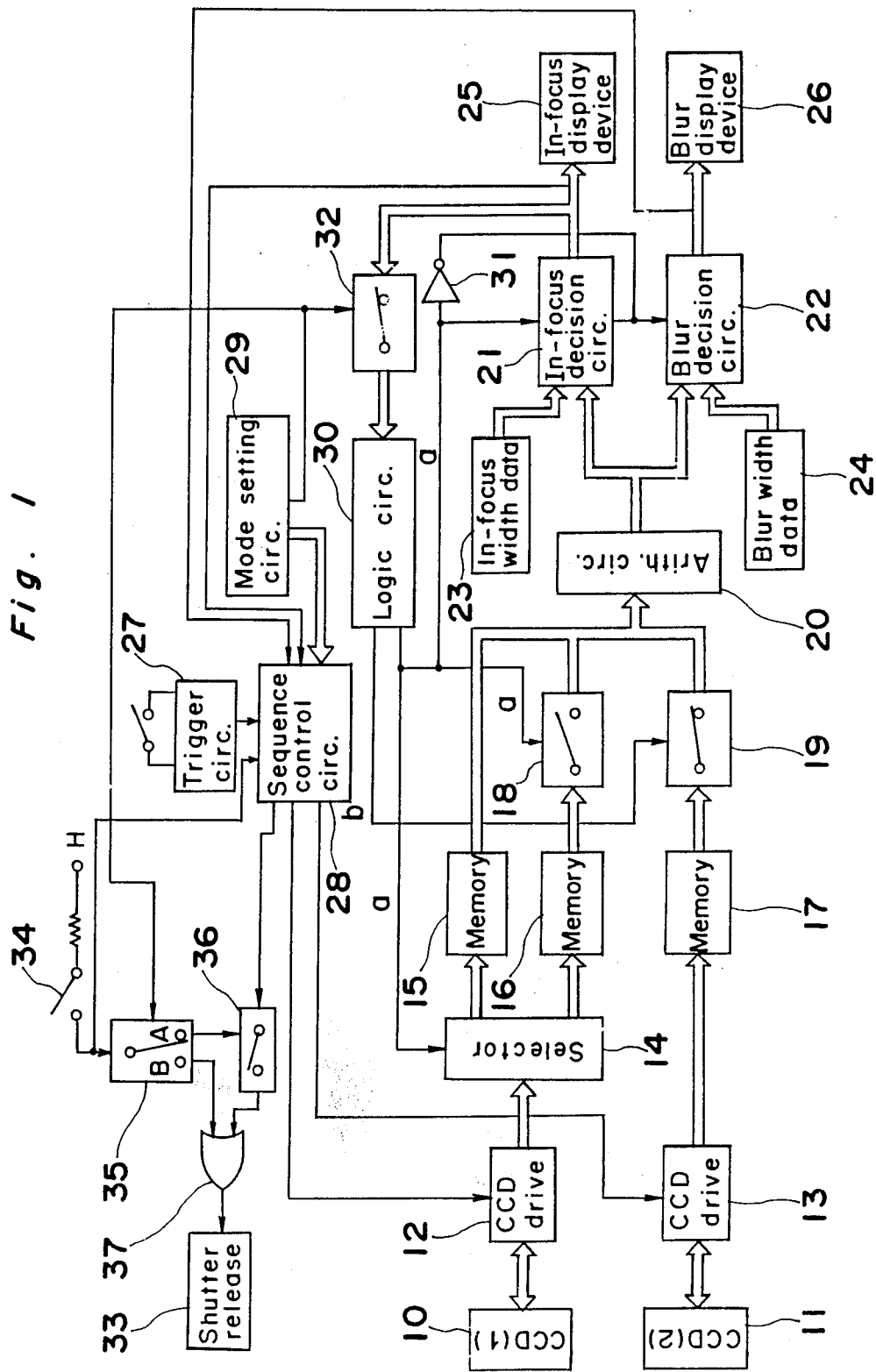
FIG. 1 is an electrical block diagram of a focus detecting device according to one preferred embodiment of the present invention.

FIG. 1 is an electrical block diagram of a focus detecting device having a function of detecting blur, according to one preferred embodiment of the present invention. This embodiment employs a focus detecting means of a type in which a difference between an in-focus position of a photo-taking lens and a present position of the photo-taking lens, i.e. an amount of drive of the photo-taking lens is detected from relative positions of two images of an identical object obtained simultaneously by two image forming optical systems. Furthermore, in this embodiment, amount of blur is detected by two image signals obtained sequentially in time series by one of the image forming optical systems. The focus detecting device can be changed over to one-shot AF (automatic focusing) mode and continuous AF mode. Focus detection is started upon depression of a shutter release button to a first stage. If the focus detecting device is set to the one-shot AF mode at this time, detection of blur is performed after completion of focusing and shutter release can be performed upon depression of the shutter release button to a second stage only when a decision that there is no blur is made.

On the other hand, if the focus detecting device is set to the continuous AF mode when the shutter release button is depressed to the first stage, focus detection and focusing are repeated at high speed such that the photo-taking lens is displaced in response to change of distance between the object and the camera. Thus, in this case, upon depression of the shutter release button to the second stage at an arbitrary point of time, shutter release can be performed regardless of the focusing condition of the photo-taking lens and of whether blur is made or not.

In the case of the one-shot AF mode, even if the shutter release button is depressed to the second stage lower than the first stage at one stroke, shutter release is not effected until a decision that there is no blur is made by a blur detecting circuit after completion of focusing.

In FIG. 1, reference numerals 10 and 11 denote photo-taking elements provided for two image forming optical systems, respectively. The photo-taking elements 10 and 11 are each constituted by a CCD (charge coupled device) line sensor. An image signal obtained by the CCD 10 is stored in a memory 15 or a memory 16, while an image signal obtained by the CCD 11 is stored in a memory 17. The image signals stored in the memories 15 and 17 are signals obtained simultaneously. A gate 19 is usually enabled and in-focus detection is performed in an arithmetic circuit 20 by using data in the memories 15 and 17 such that the photo-taking lens is driven on the basis of result of in-focus detection in the arithmetic circuit 20.

In the one-shot AF mode, initially, a gate circuit 32 and the gate circuit 19 are enabled and a gate circuit 18 is disabled, while an contact of a selector circuit 35 having terminals A and B is connected to the terminal A. Focusing is performed by image signals stored in the memories 15 and 17. When an in-focus signal is outputted by an in-focus decision circuit 21 at the time of an in-focus condition, the in-focus signal is applied, through the gate circuit 32, to a logic circuit 30. Thus, the gate circuit 18 is enabled and the gate circuit circuit 19 is disabled, while a selector circuit 14 selects the memory 16. A CCD drive circuit 12 is triggered again in this state, so that an image signal is read from the CCD 10 so as to be stored in the memory 16. Meanwhile, an image signal obtained at the time of the in-focus condition is stored in the memory 15. Therefore, by using the image signals stored in the memories 15 and 16, namely the two image signals obtained at sequential points of time by the identical image forming optical system, detection and arithmetic operation of amount of blur are performed by the arithmetic circuit 20. When the amount of blur is not more than a predetermined value, a signal indicating that there is no blur is outputted by a blur decision circuit 22. When the shutter release button has been depressed to the second stage at this time, the signal indicating that there is no blur is transmitted, as a shutter drive signal, to a shutter release circuit 33 via a sequence control circuit 28, a gate circuit 36 and an OR circuit 37 such that shutter release is performed. On the contrary, when the shutter release button has not been depressed to the second stage at the time when the signal indicating that there is no blur is outputted by the blur decision circuit 22, detection of blur is repeated until the shutter release button is depressed to the second stage.

In the continuous AF mode, the gate circuits 32 and 18 are disabled, while the gate circuit 19 is enabled. Even if the above described focusing operation is performed in this state and the in-focus signal is outputted by the in-focus decision circuit 21, the in-focus signal is not inputted to the logic circuit 30 because the gate circuit 32 is disabled. Therefore, even if the focusing operation has been completed, the focusing operation is repeated without detecting blur. Hence, if the shutter release button is depressed at an arbitrary point of time, shutter release is performed.

More specifically referring to FIG. 1, the photo-taking elements 10 and 11 are focus detecting photo detectors and are each constituted by a one-dimensional line sensor such as a CCD, etc. The CCD drive circuits 12 and 13 output digital signals by converting thereinto analog signals outputted by the focus detecting photo detectors 10 and 11, respectively and output signals for driving the focus detecting photo detectors 10 and 11, respectively. The selector circuit 14 selectively outputs, in accordance with a control signal inputted thereto from the logic circuit 30 through a signal line a, to the memories 15 and 16 a digital image signal applied to the selector circuit 14 from the CCD drive circuit 12. For example, when a decision of the in-focus condition is made, namely the signal line a is at its low level, the memory 15 is set to an open state and the memory 16 is set to a closed state. On the other hand, when a decision that there is blur is made, namely the control line a is at its high level, the memory 15 is set to a closed state and the memory 16 is set to an open state.

The memories 15 and 16 are digital memories for storing the digital image signals inputted from the CCD drive circuit 12. The memory 17 is a digital memory for storing a digital image signal inputted from the CCD drive circuit 13. The gate circuits 18 and 19 receive the digital image signals from the digital memories 16 and 17, respectively. Control signals are, respectively, applied to the gate circuits 18 and 19 from the logic circuit 30 through signal lines a and b. When the control signals are at high level, the gate circuits 18 and 19 are enabled, namely, the gate circuits 18 and 19 are set to the ON state such that the digital image signals of the digital memories 16 and 17 are transferred to the arithmetic circuit 20.

When the focus detecting device is set to an operational phase for performing focus detection, the arithmetic circuit 20 calculates a defocus amount of the photo-taking lens in accordance with a predetermined algorithm by using the digital image signals transferred from the digital memories 15 and 17 so as to output the defocus amount to the in-focus decision circuit 21. When the focus detecting device is set to an operational phase for detecting blur, the arithmetic circuit 20 calculates an amount of blur in accordance with a predetermined algorithm by using data in the memories 15 and 16 so as to output the amount of blur to the blur decision circuit 22. The in-focus decision circuit 21 receives the above described defocus amount from the arithmetic circuit 20 and data of permitted tolerance of defocus from an in-focus width data circuit 23 and compares the two data with each other so as to output the in-focus signal or a defocus signal.

An in-focus display device 25 displays the in-focus condition or the defocus condition on the basis of an in-focus decision signal outputted by the in-focus decision circuit 21. The blur decision circuit 22 receives a signal representing the above described amount of blur from the arithmetic circuit 20 and data of permitted tolerance of blur from a blur width data circuit 24 and compare the two data with each other so as to output a blur decision signal as to whether or not there is blur. A blur display device 26 displays presence and absence of blur on the basis of the blur decision signal outputted by the blur decision circuit 22. A trigger circuit 27 generates a focus detection start signal in response to turning on and off of the shutter release button and another switch or depression of the shutter release button to the first stage, etc. This focus detection start signal is outputted to the sequence control circuit 28.

The sequence control circuit 28 controls not only the CCD drive circuits 12 and 13 but also the whole system and starts control in response to the above described focus detection start signal from the trigger circuit 27. Meanwhile, a switch 34, which is closed in response to depression of the shutter release button to the second stage, is connected to the sequence control circuit 28. Thus, when the shutter release button has been depressed to the second stage, a high level signal is applied to the sequence control circuit 28. At this time, if data indicating that there is no blur is simultaneously inputted to the sequence control circuit 28 in the case of the one-shot AF mode, detection of blur is suspended. A mode setting circuit 29 performs setting of a signal of the one-shot AF mode and the continuous AF mode in response to a position of a setting dial (not shown), etc. so as to output this mode setting signal to the sequence control circuit 28, the gate circuit 32 and the selector circuit 35. Only when the mode setting signal is set to the one-shot AF mode, the gate circuit 32 enables a line from the in-focus decision circuit 21, namely the gate circuit 32 sets the line from the in-focus decision circuit 21 to the ON state and thus, the in-focus signal is inputted to the logic circuit 30. The logic circuit 30 has output lines a and b. Usually, the output line a is set to the low level and the output line b is set to the high level. In the case where the mode setting signal is set to the one-shot AF mode, the control signal from the logic circuit 30 is set to the high level at the signal line a and the low level at the signal line b when the in-focus signal has been inputted to the logic circuit 30 from the in-focus decision circuit 21. A NOT circuit 31 inverts a signal applied from the logic circuit 30 through the control line a so as to output the inverted signal to the blur decision circuit 22.

Namely, when the signal inputted to the NOT circuit 31 from the logic circuit 30 through the signal line a is at the low level, an output of the NOT circuit 31 assumes the high level. On the contrary, when the signal inputted to the NOT circuit 31 from the logic circuit 30 through the signal line a is at the high level, the output of the NOT circuit 31 assumes the low level. The in-focus decision circuit 21 and the blur decision circuit 22 are arranged to be driven only when signals inputted thereto are at the low level. Therefore, when a low level signal is inputted to the signal line a from the logic circuit 30, the in-focus decision circuit 21 is set to a state enabling its actuation. On the other hand, when a high level signal is inputted to the signal line a from the logic circuit 30, the blur decision circuit 22 is set to a state enabling its actuation. Thus, the in-focus decision circuit 21 and the blur decision circuit 22 are selectively actuated.

The gate circuit 32 receives the in-focus decision signal from the in-focus decision circuit 21 and the mode setting signal from the mode setting circuit 29. When the mode setting signal is set to the one-shot AF mode, the gate circuit 32 is enabled, namely the gate circuit 32 is set to the ON state such that the in-focus decision signal of the in-focus decision circuit 21 is outputted to the logic circuit 30. Meanwhile, when the mode setting signal is set to the continuous AF mode, the gate circuit 32 is disabled, namely the gate circuit 32 is set to the OFF state such that the in-focus decision signal of the in-focus decision circuit 21 is prevented from being outputted to the logic circuit 30.

Accordingly, only in the case of the one-shot AF mode, the output of the in-focus decision circuit 21 can be applied to the logic circuit 30. When the in-focus signal has been applied to the logic circuit 30, the high level signal and the low level signal are, respectively, inputted from the logic circuit 30 to the signal lines a and b and thus, the focus detecting device is set to a state for measuring blur. One terminal of the switch 34 is connected to a high level such as a power source, while the other terminal of the switch 34 is connected to the selector circuit 35. The switch 34 is normally open, i.e. in the OFF state and is closed, i.e. in the ON state upon depression of the shutter release button to the second stage so as to output the high level signal to the selector circuit 35. The signal from the switch 34 and the output signal from the mode setting circuit 29 are inputted to the selector circuit 35. When the output signal of the mode setting circuit 29 assumes the high level for the one-shot AF mode, the contact of the selector circuit 35 is connected to the terminal A. On the other hand, when the output signal of the mode setting circuit 29 assumes the low level for the continuous AF mode, the contact of the selector circuit 35 is connected to the terminal B.

The gate circuit 36 receives the output signal from the sequence control circuit 28 and the output signal from the terminal A of the selector circuit 35. When the output signal from the terminal A of the selector circuit 35 is at the high level, the gate circuit 36 is enabled, namely the gate circuit 36 is set to the ON state such that the output signal of the sequence control circuit 28 is outputted from the gate circuit 36. The OR circuit 37 receives the output signal from the terminal B of the selector circuit 35 and the output signal from the gate circuit 36. When either one of the output signals inputted to the OR circuit 37 from the terminal B of the selector circuit 35 and the gate circuit 36 assumes the high level, the OR circuit output a high level signal.

The shutter release circuit 33 is connected to the output terminal of the OR circuit 37. At the time of the one-shot AF mode, the contact of the selector circuit 35 is connected to the terminal A by the output of the mode setting circuit 29. Therefore, when the switch 34 is turned on, a high level signal is applied to the gate circuit 36, so that the gate circuit 36 is enabled, namely the gate circuit 36 is set to the ON state. If a signal indicating that there is no blur is inputted from the blur decision circuit 22 to the sequence control circuit 28, a high level signal is applied to the gate circuit 36 and is transmitted, through the OR circuit 37, to the shutter release circuit 33, so that shutter release is performed so as to start exposure control. At the time of the continuous AF mode, the contact of the selector circuit 35 is connected to the terminal B. Thus, when the switch 34 is turned on, a high level signal is outputted from the terminal B of the selector circuit 35 to the OR circuit 37 and thus, shutter release is performed immediately.

Hereinbelow, operation of the focus detecting device of the above described arrangement is described. Firstly, the one-shot AF mode is described. In the one-shot AF mode, when a decision that there is no blur is made after focusing, shutter release can be performed automatically. Initially, the mode setting circuit 29 is set to the one-shot AF mode. The one-shot AF mode signal is outputted from the mode setting circuit 29 to the sequence control circuit 28, the gate circuit 32 and the selector circuit 35. When the one-shot AF mode signal is inputted to the sequence control circuit 28, sequence control is set for enabling release of a shutter (not shown) of the camera in the case where a decision that there is no blur has been made after focusing. When the one-shot AF mode signal is inputted to the gate circuit 32, the gate circuit 32 is enabled. Meanwhile, when the one-shot AF mode signal is inputted to the selector circuit 35, the contact of the selector circuit 35 is connected to the terminal A. Since the gate circuit 32 is enabled, the logic circuit 30 receives the one-shot AF mode signal, so that the signal line a is set to the low level and the signal line b is set to the high level.

In this state, when the photographer turns on the shutter release button or another button, a start signal is outputted from the trigger circuit 27 at a predetermined interval such that focus detection is started. When the start signal from the trigger circuit 27 is inputted to the sequence control circuit 28, the sequence control circuit 28 outputs start signals to the CCD drive circuits 12 and 13, respectively. When the start signals are applied to the CCD drive circuits 12 and 13, CCD drive start signals are applied from the CCD drive circuits 12 and 13 to the CCD 10 and 11, respectively. Thus, analog image signals detected by the CCD 10 and 11 are converted into digital image signals by the CCD drive circuits 12 and 13, respectively. Since the signal outputted from the logic circuit 30 through the signal line a is at the low level, the digital image signal outputted from the CCD drive circuit 12 is transferred to the digital memory 15 by the selector circuit 14 so as to be stored in the digital memory 15. Meanwhile, the digital image signal outputted from the CCD drive circuit 13 is transferred to the digital memory 17 so as to be stored in the digital memory 17.

Since the high level signal is outputted from the logic circuit 30 through the signal line b, the gate circuit 19 is enabled, namely the gate circuit 19 is set to the ON state. Thus, the digital image signals stored in the digital memories 15 and 17 are transferred to the arithmetic circuit 20 so as to be subjected to arithmetic operation of the arithmetic circuit 20 in accordance with a predetermined algorithm. A defocus amount obtained by the arithmetic operation is transferred to the in-focus decision circuit 21. It should be noted here that since the low level signal is inputted to the signal line a from the logic circuit 30, the in-focus decision circuit 21 can be actuated and the blur decision circuit 22 cannot be actuated as described earlier. Meanwhile, data on a permissible in-focus width are inputted from the in-focus width data circuit 23 to the in-focus decision circuit 21 such that the defocus amount and the data of the permissible in-focus width are compared with each other by the in-focus decision circuit 21. If it is found by the in-focus decision circuit 21 that the defocus amount falls within the predetermined in-focus width, an element for displaying the in-focus condition is turned on by the in-focus display device 25 and the in-focus signal is outputted from the in-focus decision circuit 21 to the gate circuit 32.

On the other hand, if it is found by the in-focus decision circuit 21 that the defocus amount does not fall within the predetermined in-focus width, a motor (not shown) is rotated through a drive circuit (not shown) so as to displace a taking lens system through the defocus amount in the optical axis such that focus detection is performed again. Since this operation is not associated with the object of the present invention, detailed description thereof is abbreviated for the sake of brevity.

When the in-focus signal is inputted to the gate circuit 32, the logic circuit 30 outputs the high level signal to the signal line a and the low level signal to the signal line b. When the signal line a is set to the high level, the in-focus decision circuit 21 cannot be actuated and the blur decision circuit 22 can be actuated, so that the focus detecting device is changed over to the blur detecting state from the focus detecting state. The signal line a is also connected to the selector circuit 14 and the gate circuit 18 and the selector circuit 14 applies the output of the CCD drive circuit 12 to the memory 16 in place of the memory 15. Therefore, it will be understood that the image signal obtained at the time of the in-focus condition is stored in the memory 15. Meanwhile, the gate circuit 18 is enabled from the disabled state, namely the gate circuit 18 is set to the ON state from the OFF state.

The start signal is outputted at a predetermined interval from the trigger circuit 27 as described earlier. Thus, if the start signal is outputted from the trigger circuit 27 in this blur detecting state, the start signal is outputted from the sequence control circuit 28 to the CCD drive circuit 12 in the same manner as described earlier. Thus, the CCD drive start signal is applied from the CCD drive circuit 12 to the CCD 10. Then, the analog image signal detected by the CCD 10 is converted into the digital image signal by an A/D converter provided in the CCD drive circuit 12 and the digital image signal is transferred to the digital memory 16 by the selector circuit 14 so as to be stored in the digital memory 16. When predetermined data have been stored in the digital memory 16, the data of the digital memories 15 and 16 are transferred to the arithmetic circuit 20 so as to be subjected to arithmetic operation of the arithmetic circuit 20 in accordance with a predetermined algorithm. Subsequently, degree of coincidence between the image signals of the digital memories 15 and 16 is transferred from the arithmetic circuit 20 to the blur decision circuit 22. Meanwhile, data of a permissible blur width are inputted to the blur decision circuit 22 from the blur width data circuit 24. If it is found by the blur decision circuit 22 as a result of comparison between these data that degree of deviation from coincidence between the two image signals of the digital memories 15 and 16 is not more than a predetermined value, the signal that there is no blur is outputted from the blur decision circuit 22 to the blur display device 26 and the sequence control circuit 28. When the signal that there is no blur is applied to the blur display device 26, an element for displaying that there is no blur is turned on. Detection of blur is repeatedly performed by the start signal outputted at a predetermined interval from the trigger circuit 27. However, when the shutter release button has been depressed to the second stage and the signal that there is no blur has been inputted from the blur decision circuit 22 to the sequence control circuit 28, the sequence control circuit 28 not only suspends the blur detecting operation but outputs an actuation signal to the shutter release circuit 33 through the gate circuit 36 and the OR circuit 37. When the actuation signal is inputted to the shutter release circuit 33, shutter release is performed.

Then, the continuous AF mode is described. When the mode setting circuit 29 is set to the continuous AF mode, the sequence control circuit 28 performs, after focusing, the focus detecting operation repeatedly in response to the start signal of the trigger circuit 27 without performing the blur detecting operation. The logic circuit 30 is held in the initial state, namely the signal line a is maintained at the low level and the signal line b is set at the high level. In this connection, since the gate circuit 32 is set to the OFF state, the in-focus signal is not inputted to the logic circuit 30 and thus, the logic circuit 30 is held in the initial state. Hence, the focus detecting operation is repeatedly performed without start of the blur detecting operation. Therefore, if the photographer wishes to take a photograph, the switch 34 is turned on upon further depression of the shutter release button. Hence, the high level signal is outputted from the OR circuit 37 to the shutter release circuit 33 through the contact B of the selector circuit 35. Thus, the focus detecting operation is suspended and the actuation signal is outputted to the shutter release circuit 33. When the actuation signal is inputted to the shutter release circuit 33, the shutter release circuit 33 performs shutter release. Consequently, in the case of the continuous AF mode, it becomes possible to take a photograph without losing a shutter chance.

As will be seen from the foregoing description, in the case where the focus detecting device is set to the one-shot AF mode, the focus detecting operation is initially performed and the blur detecting operation is started upon completion of the focusing operation such that shutter release can be performed at the time when there is no blur. Meanwhile, in the case where the focus detecting device is set to the continuous AF mode, only the focus detecting operation is performed such that shutter release can be performed upon completion of the focusing operation or at an arbitrary point of time during the focusing operation.

Accordingly, in accordance with the above embodiment, since the mode setting circuit for selecting the one-shot AF mode and the continuous AF mode so as to enable the photographer to perform the mode setting for selecting whether the one-shot AF mode for giving priority to image quality or the continuous AF mode for giving priority to shutter chance, functions of the photographing apparatus can be improved so as to have different functions.

Although the selecting of the functions is performed in accordance with a mode selecting between the one-shot AF mode and the continuous AF mode in the above embodiment, the selecting can be performed independently of the mode selecting.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A focus detecting device having a function of detecting blur, comprising:
   a focus detecting means;
   a blur detection means which receives two image signals of an identical object obtained in time series by an identical optical system so as to detect degree of coincidence between the two image signals, so as to detect a relative movement between the optical system and the object caused by at least one of a camera-shake and a subject shaking; and
   a selector means for selecting whether operation of said focus detecting means and said blur detection means is performed continuously or operation of only said focus detecting means is performed.

2. A focus detecting device as claimed in claim 1, further comprising:
   an automatic focusing means for performing, subsequently to focus detection of said focus detecting means, a focusing operation on the basis of a result of the focus detection; and
   a mode selecting means for selecting a one-shot automatic focusing mode in which the focus detection and the focusing operation are stopped after an in-focus condition and a continuous automatic focusing mode in which the focus detection and the focusing operation are performed repeatedly;
   said selector means performing its selection in accordance with whether the one-shot automatic focusing mode or the continuous automatic focusing mode has been selected by said mode selecting means.

3. A focus detecting device as claimed in claim 2, wherein when the one-shot automatic focusing mode has been selected by said mode selecting means, the operation of said focus detecting means and said blur detection means is performed continuously.

4. A focus detecting device as claimed in claim 3, wherein when the continuous automatic focusing mode has been selected by said mode selecting means, the operation of only said focus detecting means is performed.

5. A focus detecting device having a function of detecting blur, comprising:
   a focus detecting means;
   a blur detection means which receives two image signals of an identical object obtained in time series so as to detect degree of coincidence between the two image signals;
   an automatic focusing means for performing, subsequently to focus detection of said focus detecting means, a focusing operation on the basis of a result of the focus detection; and
   a mode selecting means for selecting a one-shot automatic focusing mode in which the focus detection and the focusing operation are stopped after an in-focus condition and a continuous automatic focusing mode in which the focus detection and the focusing operation are performed repeatedly;
   wherein when the one-shot automatic focusing mode has been selected by said mode selecting means, the operation of said focus detecting means and said blur detection means is performed continuously;
   wherein when the continuous automatic focusing mode has been selected by said mode selecting means, the operation of only said focus detecting means is performed.

* * * * *